United States Patent
Knight et al.

(10) Patent No.: US 11,882,187 B1
(45) Date of Patent: Jan. 23, 2024

(54) IOT CONTEXTUALLY-AWARE DIGITAL TWIN WITH ENHANCED DISCOVERY

(71) Applicant: cohesionIB Inc., Chicago, IL (US)

(72) Inventors: Robert Knight, Northfield, IL (US); Nikunj Patel, Naperville, IL (US); Rick Szcodronski, San Jose, CA (US)

(73) Assignee: cohesionIB, Inc., Chicago, IL (US)

(*) Notice: Subject to any disclaimer, the term of this patent is extended or adjusted under 35 U.S.C. 154(b) by 0 days.

(21) Appl. No.: 18/180,544

(22) Filed: Mar. 8, 2023

Related U.S. Application Data

(63) Continuation of application No. 17/027,070, filed on Sep. 21, 2020, now Pat. No. 11,637,899, which is a
(Continued)

(51) Int. Cl.
*H04L 67/12* (2022.01)
*H04L 67/51* (2022.01)
(Continued)

(52) U.S. Cl.
CPC ............ *H04L 67/12* (2013.01); *G05B 19/048* (2013.01); *H04L 67/1065* (2013.01); *H04L 67/51* (2022.05)

(58) Field of Classification Search
CPC ..... H04L 67/12; H04L 67/51; H04L 67/1065; G05B 19/048
(Continued)

(56) References Cited

U.S. PATENT DOCUMENTS 8,229,715 B1   7/2012 Teller et al.
8,285,521 B1  10/2012 Chim et al.
(Continued)

FOREIGN PATENT DOCUMENTS

CN   102411345 A    4/2012
CN   104238510 A   12/2014
(Continued)

OTHER PUBLICATIONS

The-Hien Dang Ha et al. "Graph of Virtual Actors (GOVA): a Big Data Analytics Architecture for IoT", <https://webcache.googleusercontent.com/search?q=cache:QhQyRuoe6Z8J:https://arxiv.org/pdf/1703.02510+&cd=2&hl=en&ct=clnk&gl=us>, (2017), pp. 1-8.
(Continued)

*Primary Examiner* — Nicholas R Taylor
*Assistant Examiner* — Chong G Kim
(74) *Attorney, Agent, or Firm* — Banner & Witcoff, Ltd.

(57) ABSTRACT

IoT devices within a commercial real-estate or residential building environment may be connected through networks, such as a Building Automation and Control network (BACnet). Systems and methods according to this disclosure provide automatic discovery of IoT devices and relationships in commercial real-estate and residential buildings and integration of the BACnet devices into the digital twin of the building. In some implementations, an IoT gateway is configured to translate the communication received from the BACnet to an IoT cloud platform and configured to normalize the data across the different security platforms into a consistent format which enables integration and interoperability of the different building system platforms that may otherwise be operating in isolation from each other. Systems and methods according to the present disclosure provide edge based analytics and control of IoT BACnet devices based on defining conditions and rules, and provide integration of multiple building systems in the context of commercial real-estate and residential buildings.

24 Claims, 8 Drawing Sheets

Related U.S. Application Data continuation of application No. 16/456,525, filed on Jun. 28, 2019, now Pat. No. 10,798,175.

(51) Int. Cl.
*H04L 67/1061* (2022.01)
*G05B 19/048* (2006.01)

(58) Field of Classification Search
USPC .......................................................... 709/224
See application file for complete search history.

(56) References Cited

U.S. PATENT DOCUMENTS

| | | |
|---|---|---|
| 8,516,572 B2 | 8/2013 | Chim et al. |
| 8,843,352 B2 | 9/2014 | Kaufmann et al. |
| 8,954,297 B2 | 2/2015 | Teller et al. |
| 11,086,298 B2 | 8/2021 | Chand et al. |
| 2015/0089399 A1 | 3/2015 | Megill et al. |
| 2015/0234946 A1 | 8/2015 | Teller et al. |
| 2015/0294543 A1 | 10/2015 | Ricks |
| 2016/0370771 A1 | 12/2016 | Torres Fuchslocher et al. |
| 2017/0093915 A1 | 3/2017 | Ellis et al. |
| 2017/0284691 A1 | 10/2017 | Sinha et al. |
| 2017/0357738 A1 | 12/2017 | Garske et al. |
| 2018/0232459 A1 | 8/2018 | Park et al. |
| 2018/0309818 A1 | 10/2018 | Park et al. |
| 2018/0357334 A1* | 12/2018 | Chao ................. G05B 19/4185 |
| 2018/0364654 A1 | 12/2018 | Locke et al. |
| 2019/0014004 A1* | 1/2019 | Horiuchi .............. H04L 41/147 |
| 2019/0094827 A1 | 3/2019 | Park et al. |
| 2019/0107830 A1 | 4/2019 | Duraisingh et al. |
| 2019/0107831 A1 | 4/2019 | Duraisingh |
| 2019/0107832 A1 | 4/2019 | Strand et al. |
| 2019/0108013 A1 | 4/2019 | Duraisingh et al. |
| 2019/0109725 A1 | 4/2019 | Duraisingh |
| 2019/0109907 A1 | 4/2019 | Duraisingh |
| 2019/0158309 A1 | 5/2019 | Park et al. |
| 2019/0179282 A1 | 6/2019 | Gotz et al. |
| 2019/0199810 A1 | 6/2019 | Karon et al. |
| 2019/0265661 A1 | 8/2019 | Sakellariadis et al. |
| 2019/0302157 A1 | 10/2019 | Vitullo et al. |
| 2020/0012265 A1 | 1/2020 | Thomsen et al. |
| 2020/0227178 A1 | 7/2020 | Lombardi et al. |
| 2020/0265329 A1 | 8/2020 | Thomsen et al. |
| 2020/0285203 A1 | 9/2020 | Thakur et al. |
| 2020/0304375 A1 | 9/2020 | Chennai et al. |
| 2020/0313925 A1 | 10/2020 | Singh et al. |

FOREIGN PATENT DOCUMENTS

| | | |
|---|---|---|
| CN | 109739099 A | 5/2019 |
| KR | 20170143354 A | 12/2017 |
| WO | 2019067631 A1 | 4/2019 |

OTHER PUBLICATIONS

Big IoT—Bridging the Interoperability Gap of the Internet of Things Deliverable 4.1B: Design of Marketplace, <http://big-iot.eu/wp-content/uploads/2016/04/d4.1b-design_of_marketplace.pdf> (2017), pp. 1-131.
Fierro et al. "A Uniform Metadata Schema for Buildings", Brick Schema, https://brickschema.org/, (2019), p. 1.
Oct. 27, 2020—(WO) International Search Report and Written Opinion application PCT/US2020/039526.
Aug. 12, 2020—U.S. Notice of Allowance—U.S. Appl. No. 16/456,630.
Dec. 22, 2021—U.S. Final Office Action—U.S. Appl. No. 17/027,070.
Jan. 13, 2022—U.S. Final Office Action—U.S. Appl. No. 17/026,995.
Jun. 3, 2022—U.S. Non-Final Office Action—U.S. Appl. No. 17/026,995.
Jul. 15, 2021—U.S. Non-Final Office Action U.S. Appl. No. 17/026,995.

* cited by examiner ical real estate building is provided. The system
IOT CONTEXTUALLY-AWARE DIGITAL TWIN WITH ENHANCED DISCOVERY This application is a continuation of U.S. patent application Ser. No. 17/027,070 filed Sep. 21, 2020, which is a continuation of U.S. patent application Ser. No. 16/456,525 filed Jun. 28, 2019. The present application claims priority to and the benefit of the above-identified applications and the above-identified applications are incorporated by reference herein in their entirety.

FIELD

Aspects described herein generally relate to building automation, IoT (Internet of Things) devices, and hardware and software related thereto. More specifically, one or more aspects describe herein provide intelligent commercial real-estate and residential building systems and automation.

BACKGROUND

IoT devices within a commercial real-estate building environment may be connected through networks with different wired or wireless communication protocols, such as Ethernet or Building Automation and Control network (BACnet), which is a wired communications protocol that allows the building automation and control systems to communicate back up to a network. The IoT devices within a commercial real-estate building environment may be connected to the Internet via an IoT Gateway. The IoT Gateway bridges IoT BACnet devices with the Internet by performing a communication protocol translation between the BACnet and Internet.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

According to one aspect, the disclosure relates to a computer-implemented method of generating a contextually-aware digital twin of a commercial real estate or residential building. The method includes receiving information about an asset comprising one or more devices residing in one or more physical spaces associated with the commercial real-estate or residential building. The method includes determining based on an identification of the one or more devices of the asset, one or more points corresponding to a sensor or an actuator of the one or more devices. The method includes identifying, based on the one or more points, at least one controller that serves the asset via the one or more points. The at least one controller comprises a physical or logical entity. The method includes determining, one or more networks, and one or more locations associated with the asset. The method includes storing each of the asset, the one or more points, the at least one controller, the one or more networks, and the one or more locations as separate nodes of a graph representation of the commercial real estate building.

In some implementations, the method includes determining, based on an identification of a device connected to a network, whether the device is stored in the graph representation of the commercial real estate or residential building. In some implementations, the method includes, based on a determination that the device is not stored in the graph database of the commercial real estate building, identifying the device as a new device. In some implementations, the method includes determining one or more points corresponding to a sensor or an actuator of the new device. In some implementations, the method includes identifying, based on the one or more points of the new device, at least one controller, at least one location, and at least one network that is associated with the new device. In some implementations, the method includes storing the one or more points, the at least one controller, the at least one location, and the at least one network associated with the new device in the graph representation of the commercial real-estate building. In some implementations, the one or more devices of the asset are connected to a Building Automation Control (BAC) network. In some implementations, the one or more locations may include a physical or logical location associated with the one or more physical spaces of the commercial real estate building. The one or more locations comprise at least one of an identification of a floor, a longitude-latitude coordinate, a space, an elevation, a zone, a space zone, and an identification of an occupant of the one or more physical spaces. In some implementations, the graph representation of the building comprises a label property graph representation. In some implementations, the points comprise at least one of a setpoint value or a schedule. In some implementations, the identifying of the at least one controller associated with the new device is based on information generated by training a machine learning algorithm on one or more previously generated graph representations of the commercial real estate building.

According to certain aspects of the present disclosure, a system for generating a contextually-aware digital twin of a commercial real estate building is provided. The system includes one or more processors. The system includes a memory storing computer-readable instructions that, when executed by the one or more processors, cause the one or more processors to receive information about an asset comprising one or more devices residing in one or more physical spaces associated with the commercial real estate building. The instructions cause the one or more processors to determine based on an identification of the one or more devices of the asset, one or more points corresponding to a sensor or an actuator of the one or more devices. The instructions cause the one or more processors to identify, based on the one or more points, at least one controller that serves the asset via the one or more points. The at least one controller is a physical or logical entity. The instructions cause the one or more processors to determine, one or more networks, and one or more locations associated with the asset. The instructions cause the one or more processors to store each of the asset, the one or more points, the at least one controller, the one or more networks, and the one or more locations as separate nodes of a graph representation of the commercial real estate building.

In some implementations, the instructions cause the one or more processors to, determine, based on an identification of a device connected to a network, whether the device is stored in the graph representation of the commercial real estate building. In some implementations, the instructions cause the one or more processors to, based on a determination that the device is not stored in the graph database of the commercial real estate building, identify the device as a new device. In some implementations, the instructions cause the one or more processors to determine one or more points corresponding to a sensor or an actuator of the new device.

In some implementations, the instructions cause the one or more processors to identify, based on the one or more points of the new device, at least one controller, at least one location, and at least one network that is associated with the new device. In some implementations, the instructions cause the one or more processors to store the one or more points, the at least one controller, the at least one location, and the at least one network associated with the new device in the graph representation of the commercial real-estate building. In some implementations, the one or more devices of the asset are connected to a Building Automation Control (BAC) network. In some implementations, the one or more locations may include a physical or logical location associated with the one or more physical spaces of the commercial real estate building. The one or more locations comprise at least one of an identification of a floor, a longitude-latitude coordinate, a space, an elevation, a zone, a space zone, and an identification of an occupant of the one or more physical spaces. In some implementations, the graph representation of the building comprises a label property graph representation. In some implementations, the points comprise at least one of a setpoint value or a schedule. In some implementations, the identifying of the at least one controller associated with the new device is based on information generated by training a machine learning algorithm on one or more previously generated graph representations of the commercial real estate building.

According to certain aspects of the present disclosure, a non-transitory machine readable storage medium containing machine-readable instructions for causing a processor to execute a method of generating a contextually-aware digital twin of a commercial real estate building is provided. The instructions contained on the non-transitory machine readable storage medium cause the processor to perform a method that includes receiving information about an asset comprising one or more devices residing in one or more physical spaces associate with the commercial real estate building. The method includes determining based on an identification of the one or more devices of the asset, one or more points corresponding to a sensor or an actuator of the one or more devices. The method includes identifying, based on the one or more points, at least one controller that serves the asset via the one or more points. The at least one controller comprises a physical or logical entity. The method includes determining, one or more networks, and one or more locations associated with the asset. The method includes storing, each of the asset, the one or more points, the at least one controller, the one or more networks, and the one or more locations as separate nodes of a graph representation of the commercial real estate building.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
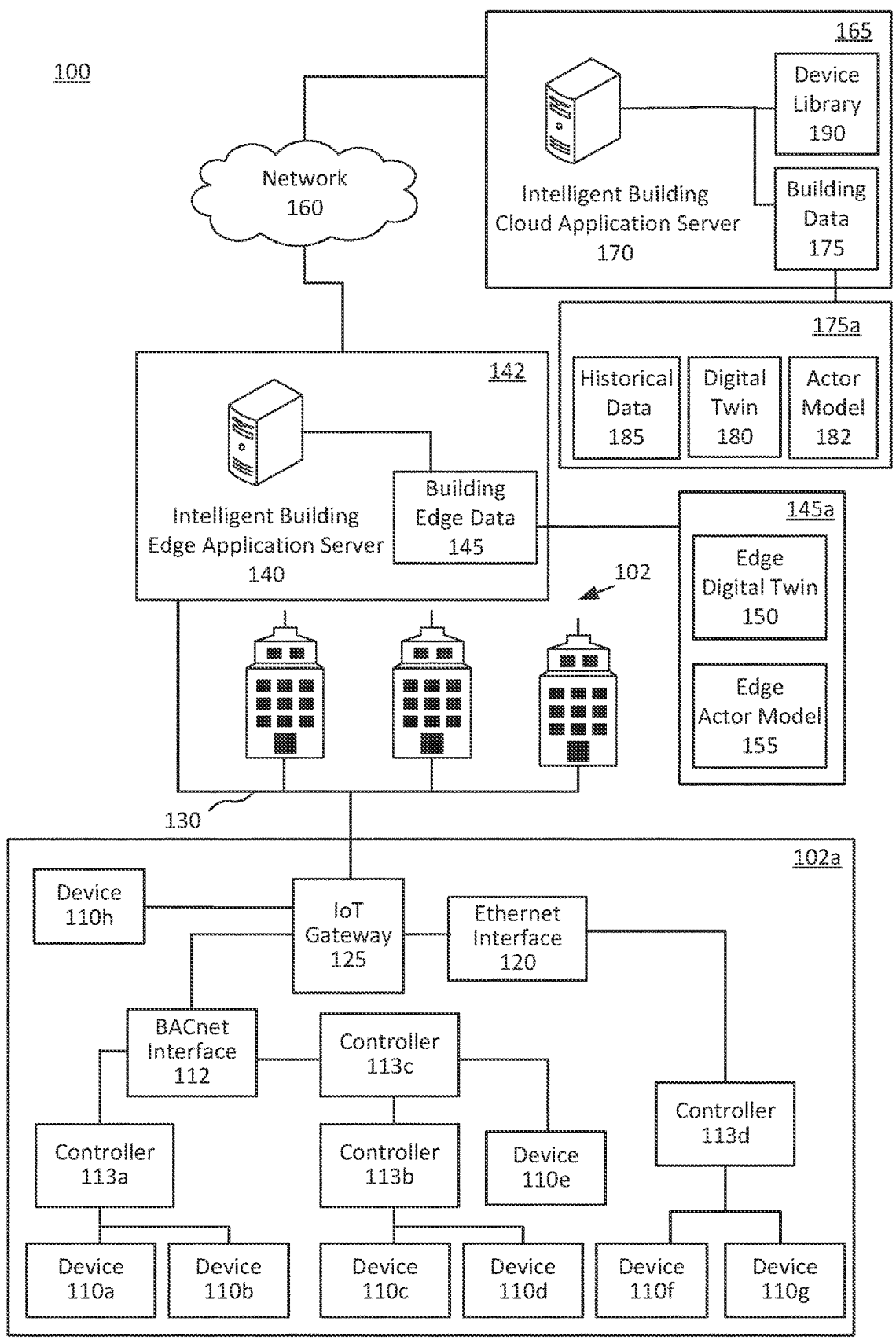
FIG. 1 depicts an illustrative environment in which an IoT contextually-aware digital twin with enhanced discovery is provided in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning, and engaging.

One technique for creating digital twins of commercial real-estate buildings relies on modeling the relationships between different physical entities, such as the building, floors, suites, and spaces, as parent-child relationships which, however, do not accurately capture the many-to-many relationships between these entities. As an example, a variable air volume (VAV) box connected to a VAV controller may serve four different spaces within a building. In a parent-child relationship model, the VAV box is at the parent level, the VAV controller is a child of the VAV box, and the four spaces within the building are children of the VAV controller. As another example, there may be four VAV boxes serving a single open space. In this example, one parent-child representation may have the single open space at the parent level with the 4 VAV boxes as children. In another parent-child representation, each VAV box may be a parent node with the open space as its child node. Thus, modeling the relationships between different physical entities in a commercial building as parent-child relationships can become complex and convoluted. However, the many-to-many relationships between physical entities in a commercial building can be modeled and stored as a graph database. Some techniques use a RDF version of a graph database which stores the relationships between entities in subject-predicate-object format, and thus, cannot go as deep as, for example, a label property version of a graph database. Additionally, one technique does not represent controllers and devices as separate entities in the graph database.

IoT devices within a commercial real-estate building environment may be connected through networks with different wired or wireless communication protocols, such as Ethernet or Building Automation and Control network (BACnet) which is a wired communications protocol that allows the building automation and control systems to communicate back up to a network. The IoT devices within a commercial real-estate building environment may be connected to the Internet via an IoT Gateway. The IoT Gateway bridges IoT BACnet devices with the Internet by performing a communication protocol translation between the BACnet and Internet. An IoT Gateway may monitor BACnet devices by periodically polling these devices. While a pubset model has been developed so that IoT devices connected through a BACnet may publish in an asynchronous fashion, the pubset model is limited by the bandwidth of the BACnet, which has a specific baud rate and thus, there is only so much data that can be pumped onto the wire.

Some techniques use centralized queues for receiving data from devices or sending data to devices, which are a single point of failure, have bottlenecks, and do not prioritize messages well. Additionally, a centralized scheduler does not account for the device response time, the number of devices that can be queried within a time interval, or the aggregation of queries over time intervals (i.e. queries over 5 second, 10 second, 15 second intervals stacking on top of each other). Further, a centralized rules engine (i.e. if temperature exceeds value 'y', then change to mode value 'z') requires too much complexity to account for dynamic rules per device.

Systems and methods according to this disclosure provide a contextually-aware digital twin of a commercial building based on a graph database representation of entities and relationships that are important in the context of commercial buildings and spaces. Every commercial building is unique. Even though two commercial buildings may look alike, the connectivity between a device and its controller may be different between the buildings. Thus, the same device may have a different relationship to its controller in each building. Further, a device and its controller may be physically separate entities. A device such as a thermostat may be placed at a specific location because that may be the best location for the thermostat to accurately determine the temperature within a space. However, the thermostat may be communicating with a controller that is in a different location from the thermostat. As another example, a variable air volume (VAV) box is an essential part of an air conditioning system in any large industrial or commercial building. The air conditioning system is, in turn, part of a HVAC system, which encompasses heating, ventilation, air conditioning, and associated control systems. The VAV box may connect to a VAV controller that controls the opening and shutting of the VAV box dials in order to control the flow of air that is coming into a building. The VAV box may also include a heating element. If the air entering into the building is not at a high enough temperature, the VAV controller may turn on the heating element in the VAV box to raise the temperature of the air entering the building. In complex commercial buildings and structures, the VAV controller is not necessarily synonymous with the VAV box or device. Instead, the VAV box and the VAV controller may be physically separate entities. Additionally, the VAV box and the VAV controller may be manufactured by different entities. A customer may mix and match the parts from different manufacturers. Thus, modeling the VAV controller and VAV box as different entities in the digital twin of the building is also useful for inventory tracking. Therefore, decoupling the thermostat and its controller into separate entities in the graph database provides an accurate IoT model of the building resulting in accurate queries and analytics. Thus, implementations according to this disclosure decouple devices and controllers in terms of how the cloud platform interacts with them. Implementations may store document level data by using the label property graph version of the graph database which store all or some of the properties of the device and points, which may be the registers of a controller of a device. The digital twin of a building may reside in the cloud and may track every device that is supported by the platform. The digital twin may track points, assets, controllers and network and location, including service location and installed location. Digital twins of different buildings may be integrated. The graph database and actor model allows us to integrate with other digital twins like BIM, energy models, third-party APIs, third-party building software and applications, etc. Additionally, relationships between entities may be modeled based on an understanding of how the actual physical equipment gets connected. For example, a controller may be managed by another upstream controller, thus, the data model's representation of parent-child relationships can scale. Further, implementations according to this disclosure enable data from traditionally separate subsystems to be combined. Implementations enable search and filtering and navigation based on location, type, etc. (e.g. all assets serving a specific room—and query power meter, HVAC, lighting, etc.). An energy model is typically a static model that gets created upon initial design and uses approximations for how systems will perform with a defined set of inputs. In some implementations, an energy model may be calibrated for HVAC zones based on a representation of a building's digital twin. Implementations according to this disclosure may leverage machine learning in which the inputs may be varied to model how the building will perform in an infinite number of scenarios.

Systems and methods according to this disclosure provide automatic discovery of IoT devices and relationships in commercial real-estate buildings and integration of the devices into the digital twin of the building. Devices may be discovered on the network based on their IP addresses. For example, BACnet devices may be discovered via the "whois" command which returns the device identifiers of BACnet devices. For example, there may be multiple different manufacturers that make VAB boxes on the market and each manufacturer may manufacture several different models. This information may be recorded in a library of devices. When a new device is discovered on the network, it may be identified based on the information recorded in the device library. Additionally, the information in the library of devices may include relationships that may arise from an asset that includes a known device. The relationships for a device may be determined based on training a machine learning algorithm on the digital twins of various commercial real-estate buildings. If a device is known, then the relationships that come from that device may be predicted, enabling automatic creation of all or some of the related entities and relationships, thereby automatically setting up the nodes and relationships of an asset in the digital twin.

Systems and methods according to this disclosure provide an IoT Gateway configured to translate the communication received from the BACnet to an IoT cloud platform. Systems and methods according to this disclosure provide an IoT Gateway configured to provide normalization of big data generated by interconnected IoT in commercial real-estate buildings. A controller may have multiple registers in which the controller stores data. Each register may be identified as a separate point. However, different manufacturers may store specific types of data in the same register. Therefore, in order to enable seamless data collection and analytics, the data generated by the IoT devices and controllers may be normalized across various manufacturers and models before transmitting to a cloud platform for further processing, storage, and integration with other systems and platforms. The normalization may be performed at the API level. For example, a typical commercial real-estate building may comprise IoT devices and controllers related to multiple different security platforms that each store data in a specific manner or format. The IoT Gateway may be configured to normalize the data across the different security platforms into a consistent format which enables integration and interoperability of the different building system platforms that may otherwise be operating in isolation from each other. Additionally, the IoT Gateway may be configured to evaluate and filter the data received from the IoT devices before transmitting the data to a cloud platform for further processing and analytics, thus reducing the impact on network processing and bandwidth. Further, the IoT Gateway may be configured to perform edge based analytics and edge based control of IoT devices, including IoT BACnet devices, within a commercial real-estate building environment. In some implementations, the IoT Gateway may be configured to control the IoT devices based on evaluating incoming real-time data with rules. The IoT Gateway may be configured to perform queries and analytics based on edge computing which does not rely on network connectivity or the cloud computing resources. This enables real-time response to events without significant increase in bandwidth or processing power.

Systems and methods according to the present disclosure provide edge based analytics and control of IoT devices based on defining conditions and rules. For example, a rule may trigger an action based on receiving real-time data related to a supply air temperature that has exceeded a min/max alarm threshold. A windowing function may ensure that a specific number of consecutive real-time data points are received or observed before the rule is triggered. Once it is confirmed that the incoming data points sufficiently meet the relevant conditions set by the rule, automatic control of the related devices may be triggered. Representations of building systems and devices may be created using an actor model. In an actor model, a plurality of actors may receive message from other actors, perform computations, manage their state, and send messages to other actors. Actors may correspond to devices or groups of devices related to building systems, such as HVAC, lighting, etc. For example, a sensor may communicate a measurement, such as temperature, to an actor corresponding to the sensor. The measurement may be communicated to the actor as a message. Upon receiving the message, the actor updates the stored state based on the sensor measurement. The actor representing the sensor may also receive messages from other actors for access to the latest sensor measurement. The actor may also send messages to the physical sensor device to update the device configuration. An actor that triggers a rule may query connected devices and assets to find an optimum solution based on the current situation of the system. Once data related to various solutions is received, the best option may be determined based on pre-determined constraints and settings, such as energy usage, time required, etc. In some implementations, device analytics may be provided to model expected performance of a device based on a current state, and the device may be controlled based on computations in real-time using context aware data. By maintaining a stateful machine representation of the device, the exact behavior of a device may be modeled by training a data analytics machine learning algorithm on the real-time data of the input and output data points of the device. Implementations may provide precision command and control for an infinite number of stateful scenarios of the device instead of just a handful that are included in the device's onboard controller.

The actor model may be implemented by a distributed computing and non-blocking framework, such as Akka. The actor model and rules may be stored in a cloud platform. In addition to hosting an actor system in the cloud, implementations may also run the actor system at the edge which avoids reliance on cloud computing and enables better real-time response. The edge device analytics may be performed on an IoT gateway.

Systems and methods according to this disclosure provide integration of multiple building systems in the context of commercial real-estate buildings. Typically, there may be multiple different building software platforms supporting a commercial real-estate building that are isolated from each other. Implementations according to this disclosure provide integration of previously isolated software platforms and related building systems. Integration of various building systems enable discovery of new patterns and insights into the building systems. Integration of various building systems also enables the automation of interactions between devices across various building systems.

FIG. 1 depicts an illustrative environment 100 in which an IoT contextually-aware digital twin with enhanced discovery is provided in accordance with one or more illustrative aspects described herein. The environment 100 includes three buildings 102a-c (generally referred to as buildings 102). The buildings 102 may be commercial real-estate or industrial buildings or structures. FIG. 1 shows an example building 102a. The example building 102a includes eight devices 110a-h (generally referred to as devices 110). The devices 110 may include electrical or mechanical devices associated with building automation systems (BAS) for applications such as heating, ventilating, and air-conditioning (HVAC), lighting control, access control, and fire detection. The devices 110 may include IoT "smart" devices. The devices 110 may include sensors and actuators. The devices 110 may be connected to one or more controllers. The example building 102a includes four controllers 113a-d (generally referred to as controllers 113). The controllers 113 may receive information, such as sensor data, from the devices 110. The controllers 113 may be configured to effectuate an action via the actuators in the devices 110 based on evaluating the received sensor data. Referring to the example building 102a, the first and second devices 110a-b are connected to the first controller 113a. The third and fourth devices 110c-d are connected to the second controller 113b. Additionally, the second controller 113b and a fifth device 110 are connected to a third controller 113c. In the example building 102a, the first through fifth devices 110a-e may be referred to as "BACnet devices" because they are connected through a Building Automation and Control network (BACnet), which is a wired communications protocol that allows communication of building automation and control systems to transmit or receive data.

In addition to the devices 110a-e that are connected to the BACnet 112, the example building 102a includes a sixth device 110f and a seventh device 110g that are connected to a fourth controller 113d. The sixth and seventh devices 110f-g may communicate via an Ethernet protocol and may be referred to as "Ethernet devices." The example building 102a includes an IoT Gateway 125 which serves as a connection point between the devices 110 and an external network, such as network 160. The BACnet devices 110a-d may connect to the IoT Gateway 125 via a BACnet Interface 112. The Ethernet devices may connect to the IoT Gateway via an Ethernet Interface 120. An eighth device 110h interfaces directly with the IoT Gateway 125. The devices 110 may leverage other networking protocols. The example building 102a may include additional devices 110 that may communicate via communications protocols, such as CoAP, DTLS MQTT, ModBus, AMQP, HTTP, HTTPS, and FTP, among others. The example building 102a may include additional devices 110 that may communicate via wireless protocols, such as IPv6, LPWAN, Zigbee, Bluetooth Low Energy, Z-Wave, RFID and NFC.

The IoT Gateway 125 may connect the devices 110 and the controllers 113 to the Intelligent Building Cloud Platform 165 over a network 160. The IoT Gateway 125 may be configured to bridge the BACnet devices 110 with the Internet by performing a communication translation between the BACnet and Internet communication protocols. The IoT Gateway 125 may communicate with an Intelligent Building Edge Application Platform 142. Additionally, the IoT Gateway 125 may be configured to evaluate and filter the data received from the IoT devices before transmitting the data to a cloud platform for further processing and analytics, thus reducing the impact on network processing and bandwidth. Further, the IoT Gateway 125 may be configured to perform edge based analytics and edge based control of IoT devices 110, including the BACnet devices 110, within the example building 102a. In some implementations, the IoT Gateway 125 may be configured to control the IoT devices 110 based on evaluating incoming real-time data with rules. The IoT Gateway 125 may be configured to perform queries and analytics based on edge computing which does not rely on network connectivity or the cloud computing resources. This enables real-time response to events without significant increase in bandwidth or processing power.

The Intelligent Building Edge Application Platform 142 include an Intelligent Building Edge Application Server 140 via a communication link 130. The Intelligent Building Edge Application Server 140 may receive data via the IoT Gateway 125 and send the data over the network 160 to the Intelligent Building Cloud Platform 165 for further processing and storage. The Intelligent Building Edge Application Server 140 may push one or more applications to configure the IoT Gateway 125 to perform various functions. Intelligent Building Edge Application Server 140 may be configured to normalize the data generated by the devices 110 and controller 113 may be normalized across various manufacturers and models before transmitting to a cloud platform, such as the Intelligent Building Cloud Application Platform 165, for further processing, storage, and integration with other systems and platforms. The normalization may be performed at the API level. The IoT Gateway 125 of different buildings may collect data specific for that building and send the collected data to the Intelligent Building Cloud Application Server which in turn process and analyze the data further for providing recommendations. For example, implementations may include training a machine learning algorithm on the data collected across various buildings to gain insights and patterns which may then in turn be analyzed for the purpose of providing recommendations to other buildings. Data from various buildings may be crowd sourced in such implementations. The Intelligent Building Edge Application Server 140 may be configured to create and manipulate a contextually-aware digital twin for each of the buildings 102 based on a graph database representation of entities and relationships that are important in the context of commercial buildings and spaces. The Intelligent Building Edge Application Server 140 may be configured to provide automatic discovery of devices located in the buildings 102, generate the various relationships arising from the discovered devices and integrate the discovered devices and relationships into the digital twins of the buildings 102.

The Intelligent Building Edge Application Server 140 may be configured to perform edge based analytics and control the devices 110. The Intelligent Building Edge Application Server 140 may be configured to generate and maintain an actor model comprising representations of building systems and devices. Actors may correspond to devices or groups of devices related to building systems, such as HVAC, lighting, etc. The Intelligent Building Edge Application Server 140 may store the generated digital twins and actor models of the buildings 102 in the Intelligent Building Cloud Platform 165. The Intelligent Building Edge Application Server 140 may also store the digital twins and the actor models of the buildings 102 at the edge as Building Edge Data 145. The Intelligent Building Edge Application Server 140 may be configured provide integration of multiple software platforms related to the building systems of the buildings 102 and to enable discovery of new patterns and insights into the building systems. The integration may enable the automation of interactions between the devices 110 across various building systems of the building 102a and across the buildings 102.

An example Building Edge Data 145a includes an Edge Digital Twin 150 and an Edge Actor Model 155. The Intelligent Building Edge Application Server 140 may use the Building Edge Data 145 for performing edge analytics and processing. The Intelligent Building Cloud Platform 165 includes an Intelligent Building Cloud Application Server 170 that may be configured to perform cloud analytics and processing. The Intelligent Building Cloud Platform 165 includes a Device Library 190 and Building Data 175. The Building Data 175 may store various information about the buildings 102. An example Building Data 175a includes a Historical Data 185, a Digital Twin 180, and an Actor Model 182. The Historical Data 185 may include data about one of the buildings 102 that is collected over a period of time. The Intelligent Building Cloud Application Server 170 may access the Historical Data 185, the Digital Twin 180, and the Actor Model 182 in order to perform analytics that provide additional insights into the devices and systems of the corresponding building 102a. The Intelligent Building Cloud Application Server 170 may store information about devices and controllers in the Device Library 190. The IoT Gateway 125 may include a Dell 500 box with a Linux operating system, and the Intelligent Building Edge Application Server 140 may include an IoTium orchestrator using an orchestration system, such as Kubernetes. The Intelligent Building Edge Application Server 140 may include software applications developed in JavaScript or TypeScript using a Backstack library, and an akka.js or scala.js framework. Additionally, PostgreSQL database system may be used for relational data, and a message broker such as Kafka, Aka Stream, RabbitMO, EventHub, etc. The Intelligent Building Cloud Application Platform 165 may include Azure data storage and analytics.

Figure 2:
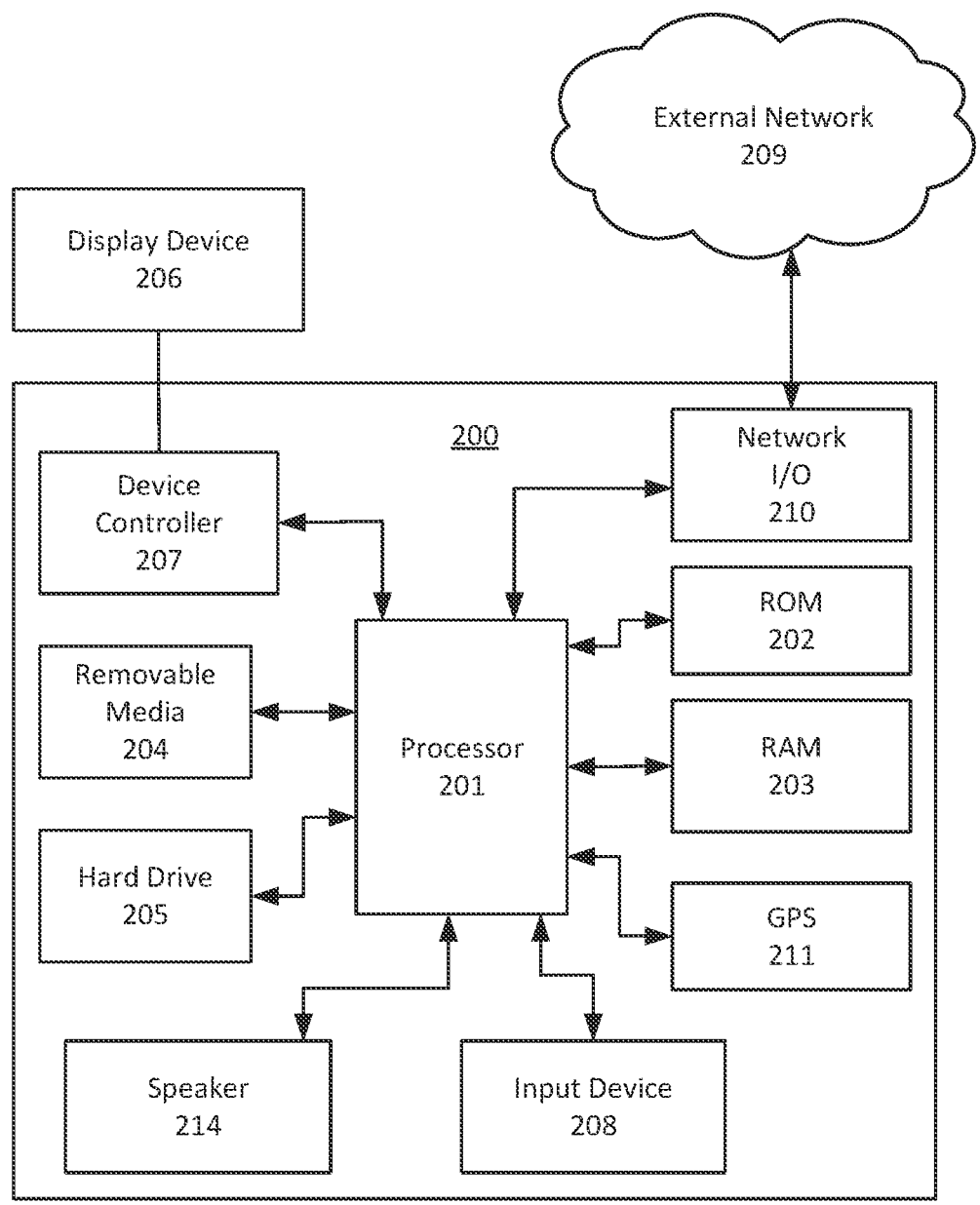
FIG. 2 shows hardware elements of a computing device that may be used to implement any of the computing devices shown in FIG. 1.

FIG. 2 shows hardware elements of a computing device 200 that may be used to implement any of the computing devices shown in FIG. 1 (e.g., any of the devices shown in the example building 102a, any of the devices shown in the Intelligent Building Cloud Application Platform 165, any devices interfacing with the external network 160) and any other computing devices discussed herein (e.g., the Intelligent Building Cloud Application Server 170 and the Intelligent Building Edge Application Server 140 in FIG. 1). The computing device 200 may comprise one or more processors 201, which may execute instructions of a computer program to perform any of the functions described herein. The instructions may be stored in read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (IC s). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
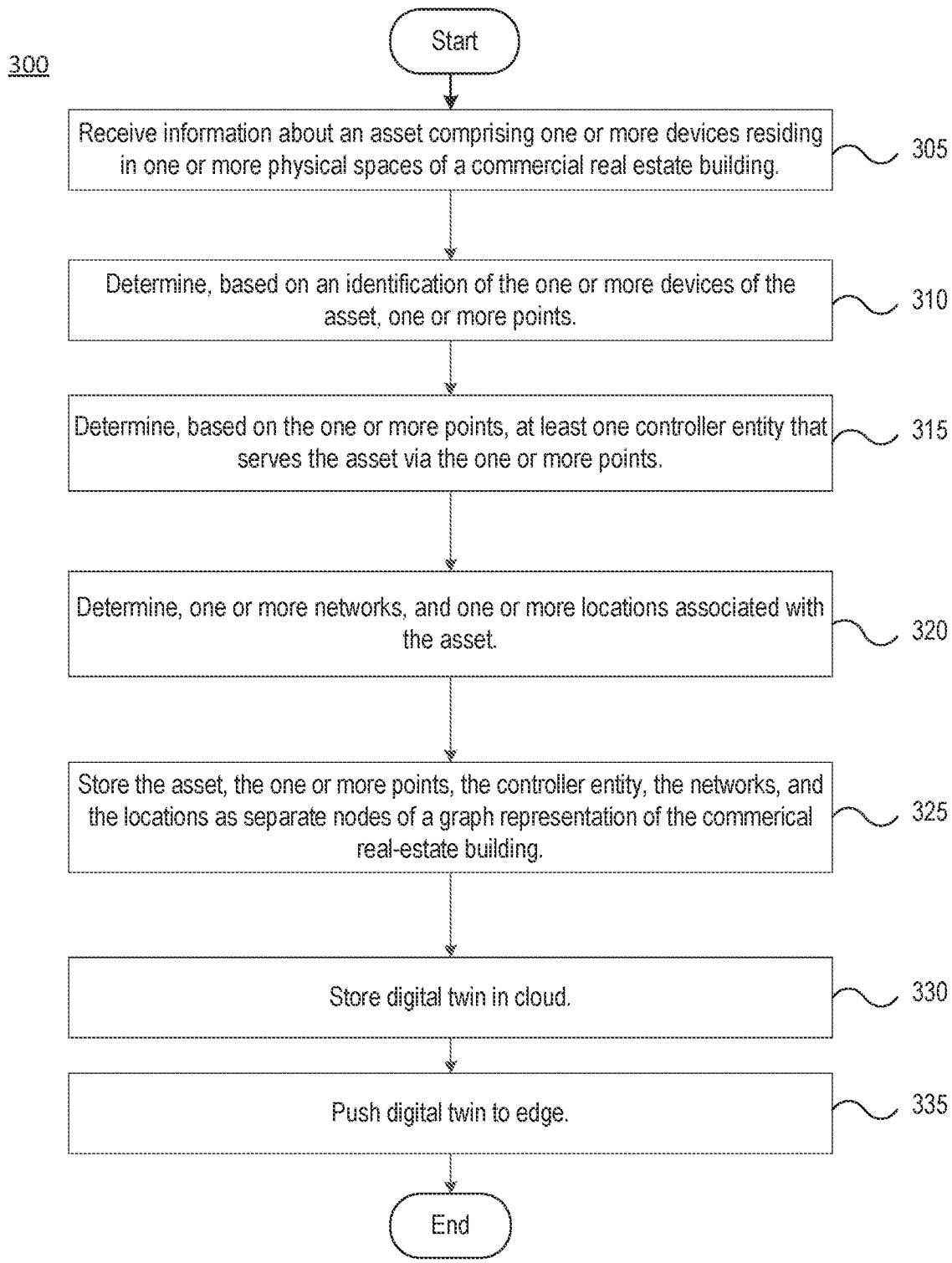
FIG. 3 illustrates an example process for providing an IoT contextually-aware digital twin with enhanced discovery performed by the example system shown in FIG. 1.

FIG. 3 illustrates an example process 300 for providing an IoT contextually-aware digital twin with enhanced discovery performed by the example system shown in FIG. 1. While FIG. 3 is described with reference to FIG. 1, it should be noted that the method steps of FIG. 3 may be performed by other systems.

A "thing" in the context of IoT (Internet of Things) may be a device configured to transmit or receive data through a network. Thus, a "thing" may be a sensor device transmitting sensor data to a controller and receiving control data from the controller. An IoT contextually-aware digital twin of a commercial real-estate building may be generated based on an IoT data model schema that defines various entities associated with a "thing", such as a type, network, manufacturer, controller, point, asset, and location. A type entity may be a classification of a thing. A thing may be classified based on different categories, such as its class and subclass. A network entity may be a collection of "things" that are connected through wired or wireless protocols. The wired protocol may be a BACnet protocol. A manufacturer entity may be a maker or producer of a "thing". A point may be a sensor or actuator of a device or controller that contains a digital or analog property. A point may be a configuration value, such as a setpoint value or a schedule. An asset entity may be physical equipment or an object that is located within a place, as understood by a person having skill in the art after review of the entirety disclosed herein. An asset may comprise multiple physical devices and/or points. An asset may have attributes, such as a serial number, or a manufacturer. Assets may be categorized into types and subtypes. Asset types may correspond to building systems, such as HVAC air, HVAC water, plumbing, fire protection, electrical, and fire alarm. Each asset type may include various subtypes. An asset type corresponding to the HVAC air system may include subtypes, such as the variable air volume (VAV) box/controller, fan powered box (FPB), fan coil unit (FCU), computer room air handler (CRAH), fan system, fan, air handling unit (AHU), heat recovery unit (HRU), and heat pump. An asset type corresponding to the HVAC water system may include subtypes, such as chilled water plant, pump, heat exchanger, unit heater, baseboard heater, duct heater, boiler, and expansion tank. An asset type corresponding to the plumbing system may include subtypes, such as pump, and grease trap. An asset type corresponding to the fire protection system may include subtypes, such as pump, and pre-action. An asset type corresponding to the electrical system may include subtypes, such as meter, switchboard, panel board, generator, transfer switch, uninterruptible power supply (UPS), lighting control panel, fire alarm control panel (FACP), and remote control panel. A controller entity may be a physical or logical entity that is associated with one or more points. A controller entity may serve one or more assets through the points of the one or more assets. A location entity may be a physical or logical identification of the whereabouts of a "thing," such as longitude-latitude coordinates, elevation, address, floor name, logical, or physical zone. The location entities may be determined based on the physical location of an asset, as well as the areas of the building that the asset serves. For example, a VAV box residing at one location may serve many other areas of the building. Location entities may have their own digital twin that defines relationships between the physical and logical locations. The digital twin of the location entities may interface with the digital twin of the asset.

The IoT data model schema enables physical devices 110 to be decoupled from their corresponding physical controllers 113 and represented as separate entities in the digital twin of the building 102a. Even though the buildings 102 may look alike, the connectivity between a device, such as a sensor device, and its controller may be different across the buildings 102. Thus, the same device 110 may have a different relationship to its controller 113 in each of the buildings 102. Further, a device and its controller may be physically separate entities. A device, such as a thermostat residing at a physical location, may communicate with a controller that is placed in a different physical location from the thermostat. The IoT data model schema enables the thermostat and its controller to be represented as different entities in the digital twin of the building. According to the IoT data model schema, the sensors and actuators of the thermostat may be mapped to one or more points, and its physical controller may be mapped to a controller entity. As another example, in complex commercial buildings and structures, a VAV controller may not be synonymous with the VAV box or device that it controls. Instead, the VAV box and its VAV controller may be physically separate entities. Additionally, the VAV box and its VAV controller may have different manufacturers, so that a customer may mix and match the parts from different manufacturers. In this case, representing the VAV controller and VAV box as different entities in the digital twin is also useful for inventory tracking. Therefore, according the IoT data model schema, the sensors and actuators of the VAV box may be mapped to points and the VAV controller may be mapped to a controller entity. In some cases, a device may include sensors, actuators, and control logic within the same physical device. According to the IoT data model schema, the sensors, actuators, and control logic of the device may be mapped to points and a logical controller entity, and thus decoupled from each other and represented as separate entities in the digital twin of the building. Decoupling devices from their corresponding controllers and representing them as separate entities provides a more accurate digital twin of the building resulting in more accurate querying and analytics.

Figure 6:
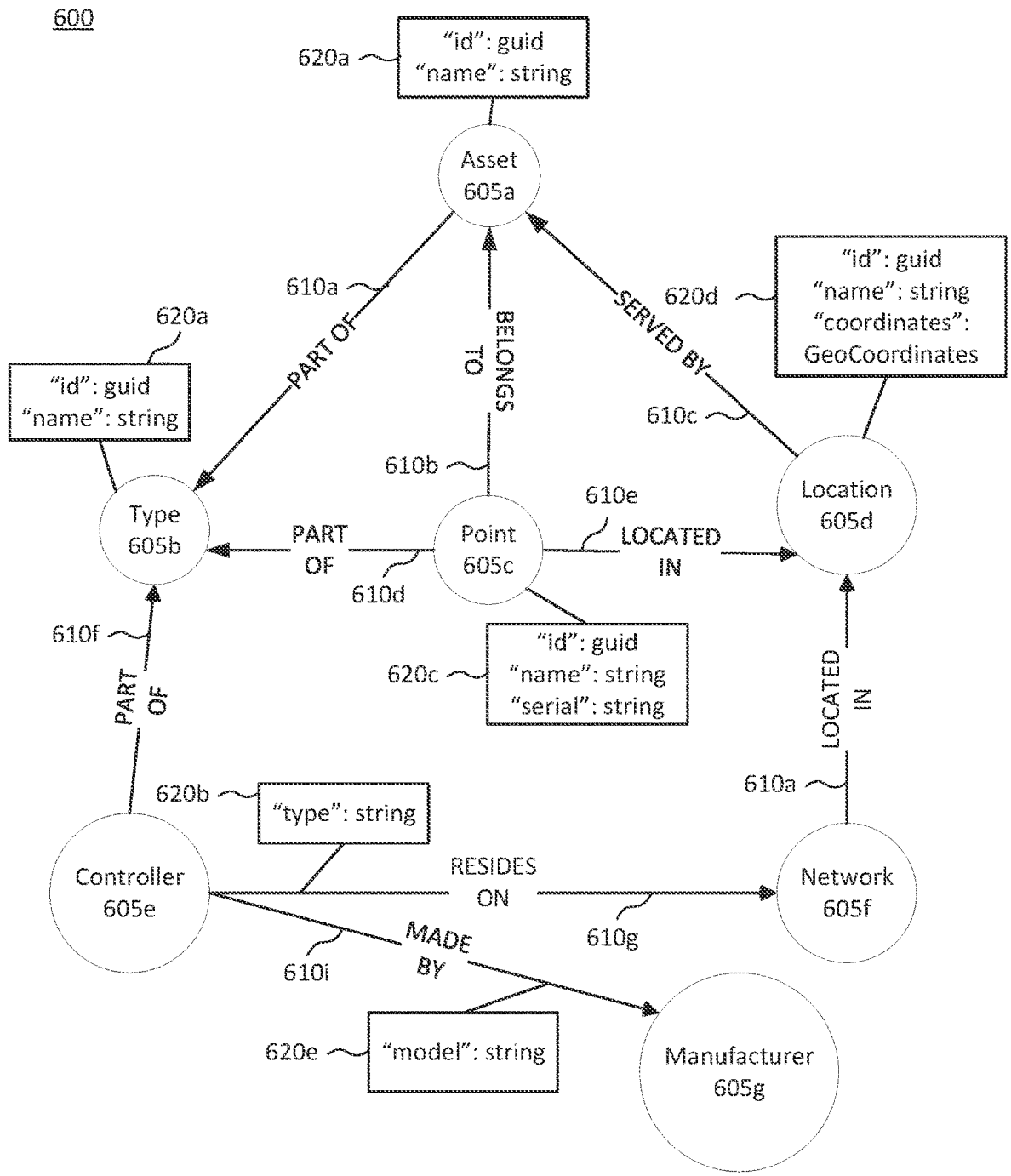
FIG. 6 illustrates an example graph schema of various entities and relationships.

FIG. 6 illustrates an example graph schema 600 of the various entities and relationships. The graph schema 600 includes a plurality of nodes 605a-g (generally referred to as nodes 605). The asset, type, point, location, controller, network, and manufacturer entities are represented respectively as the nodes 605a-g of the graph schema 600. The graph schema 600 includes a plurality of edges 610a-i (generally referred to as edges 610). The edges 610 represent relationships between the nodes 605 and their corresponding entities. The edges may be directional and may include properties. The relationship between the asset entity of node 605a and the type entity of node 605b is represented as an edge 610a. The direction of the edge 610a is from the asset entity of node 605a to the type entity of node 605b. The property of the edge 610a indicates that the asset entity of node 605a is a "part of" the type entity of node 605b. The nodes 605 may include properties. The property 620a of the asset entity of node 605a includes an "id" in a GUID format and a "name" in a string format. The relationship between the asset entity of node 605a and the point entity of node 605c is represented as an edge 610b. The direction of the edge 610b is from the asset entity of node 605a to the point entity of node 605c. The property of the edge 610b indicates that the point entity of node 605c "belongs to" the asset entity of node 605a. The property of the point entity of node 605c includes an "id" in a GUID format and a "name" in a string format. The relationship between the asset entity of node 605a and the location entity of node 605d is represented as the edge 610c. The direction of the edge 610c is to the asset entity of node 605a from the location entity of node 605d. The property of the edge 610c indicates that the asset entity of node 605a is "served by" the location entity of node 605d. The property 620c of the point entity of node 605c includes an "id" in a GUID format and a "name" in a string format. The relationship between the type entity of node 605b and the point entity of node 605c is represented as the edge 610d. The direction of the edge 610d is from the point entity of node 605c to the type entity of node 605b. The property of the edge 610d indicates that the point entity of node 605c is "part of" the type entity of node 605b. The relationship between the location entity of node 605d and the point entity of node 605c is represented as the edge 610e. The direction of the edge 610e is from the point entity of node 605c to the location entity of node 605d. The property of the edge 610e indicates that the point entity of node 605c is "located in" the location entity of node 605d. The relationship between the controller entity of node 605e and the type entity of node 605b is represented as the edge 610f. The direction of the edge 610f is from the controller entity of node 605e to the type entity of node 605b. The property of the edge 610f indicates that the controller entity of node 605e is "part of" the type entity of node 605b. The relationship between the controller entity of node 605e and the network entity of node 605f is represented as the edge 610g. The direction of the edge 610g is from the controller entity of node 605e to the network entity of node 605f. The property of the edge 610g indicates that the controller entity of node 605e "resides on" the network entity of node 605f. The relationship between the controller entity of node 605e and the manufacturer entity of node 605g is represented as the edge 610i. The direction of the edge 610i is from the controller entity of node 605e to the manufacturer entity of node 605g. The property of the edge 610i indicates that the controller entity of node 605e is "made by" the manufacturer entity of node 605g. The relationship between the location entity of node 605d and the network entity of node 605f is represented as the edge 610h. The direction of the edge 610h is to the location entity of node 605d from the network entity of node 605f. The property of the edge 610h indicates that the network entity of node 605f is located in, as understood by a person of skill in the art after review of the entirety disclosed herein, the location entity of node 605f.

Figure 7:
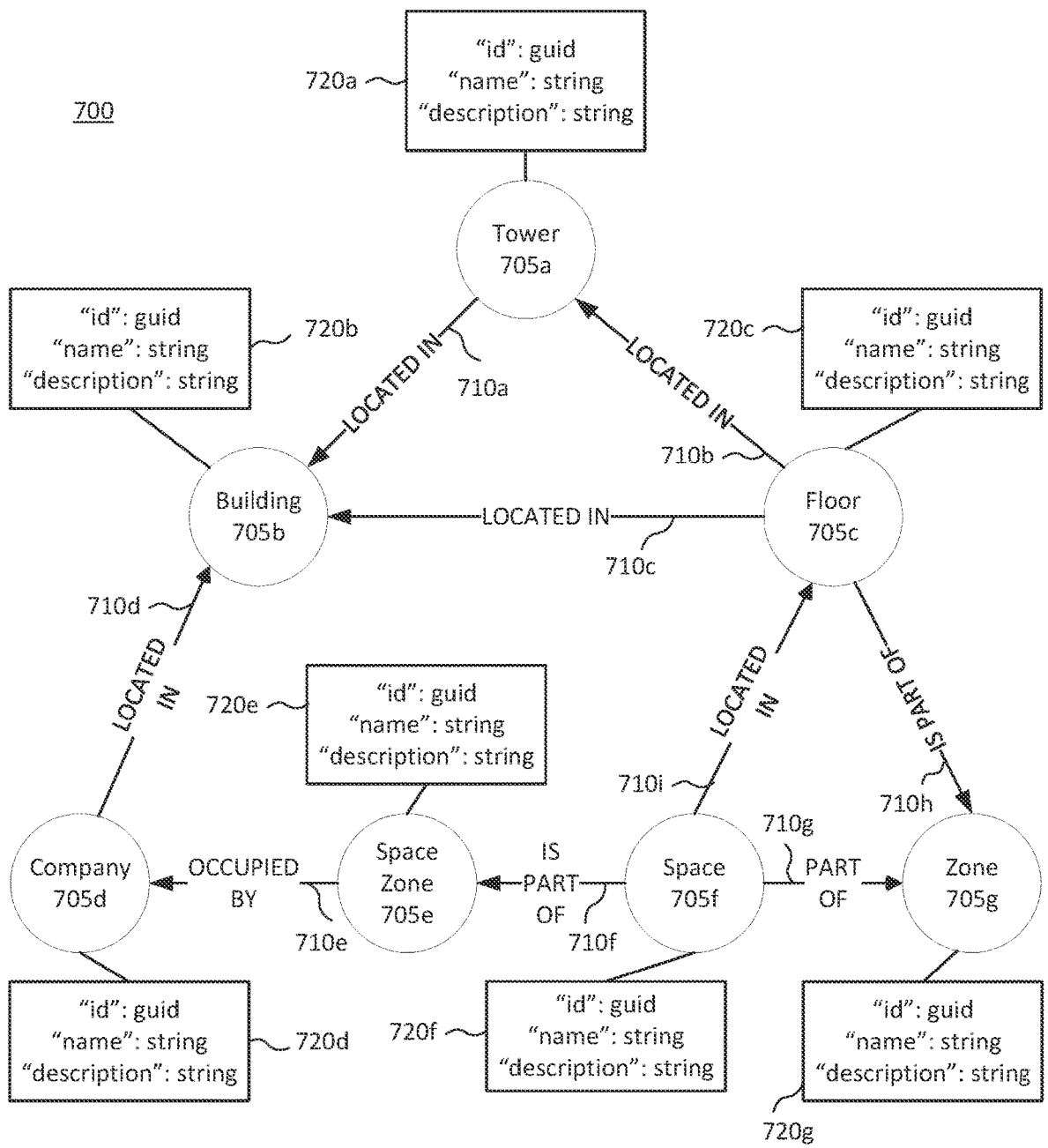
FIG. 7 illustrates an example graph schema of the location entities.

FIG. 7 illustrates an example graph schema 700 of the location entities. Each of the location entities, such as tower, building, floor, company, space zone, space, and zone, correspond to a logical or physical location associated with the building. The tower, building, floor, company, space zone, space, and zone are represented respectively as the nodes 705a-g (generally referred to as nodes 705) of the graph 700. The nodes 705 may include properties 720a-g, such as as an "id" in a GUID format, a "name" in a string format, and a "description" in a string format. The graph representation 700 includes a plurality of edges 710a-g that represent relationships between the location entities mapped to the nodes 705. The relationship between the tower entity of node 705a and the building entity of node 705b is represented by the edge 710a. The direction of the edge 710a is from the tower entity of node 705a to the building entity of node 705b. The property of the edge 710a indicates that the tower entity of node 705a is a "located in" the building entity of node 705b. The relationship between the tower entity of node 705a and the floor entity of node 705c is represented by the edge 710b. The direction of the edge 710b is to the tower entity of node 705a from the floor entity of node 705c. The property of the edge 710b indicates that the floor entity of node 705c is a "located in" the tower entity of node 705a. The relationship between the building entity of node 705b and the floor entity of node 705c is represented by the edge 710c. The direction of the edge 710c is to the building entity of node 705b from the floor entity of node 705c. The property of the edge 710c indicates that the floor entity of node 705c is a "located in" the building entity of node 705b. The relationship between the building entity of node 705b and the company entity of node 705d is represented by the edge 710d. The direction of the edge 710d is to the building entity of node 705b from the company entity of node 705d. The property of the edge 710d indicates that the company entity of node 705d is a "located in" the building entity of node 705b. The relationship between the space zone entity of node 705e and the company entity of node 705d is represented by the edge 710e. The direction of the edge 710e is from the space zone entity of node 705e to the company entity of node 705d. The property of the edge 710e indicates that the space zone entity of node 705d is a "occupied by" the company entity of node 705d.

Referring back to FIG. 1, the example building 102a may include one or more building systems. Each building system may include one or more assets. As discussed above, an asset is an entity that is associated with a "thing." An asset may be physical equipment or an object that is located within a place. An asset may be associated with multiple physical devices 110 and/or points. An asset may also include attributes, such as a serial number, or a manufacturer. At stage 305, the process 300 begins when the Intelligent Building Edge Application Server 140 receives information about an asset associated with a commercial real-estate building, such as the example building 102a in FIG. 1. The asset may be associated with a building system of a commercial real-estate building. The information about the asset may include an identification of one or more devices 110 that are associated with the asset.

A plurality of relationships associated with the asset may be identified based on determining the points, controller entities, location entities, and network entities associated with the asset. The Device Library 190 in the Intelligent Building Cloud Platform 165 may include various information about the relationships between devices and controllers generated based on training a machine learning algorithm on the data of various building systems. The plurality of relationships associated with the asset may be determined based on the points, controller entities, location entities, and network entities associated with the asset. Therefore, at stage 310, the process 300 may include determining one or more points associated with the asset. At stage 315, the process 300 may include determining one or more controller entities associated with the asset. As discussed above, the controller entities may be logical controllers or physical controllers, such as the controllers 113. At stage 320, the process 300 may include determining a plurality of location entities for the asset. The location entities may be physical and logical locations associated with the asset. The location entities may be determined based on information about the actual locations of the devices and controllers associated with the asset, the areas of the building that the devices and controllers service (service areas), and other information from Building Information Modeling (BIM) data of the building. At stage 325, the process 300 may include determining the network entities associated with the asset. At stage 330, the process 300 may include determining the upstream and downstream utilities or data flow associated with the asset, thereby identifying the controllers and devices that are associated with the upstream and downstream data flow from the asset.

In some implementations, the Intelligent Building Edge Application Server 140 may be configured to provide an application and User Interface (UI) for adding an asset. The determined relationships associated with the asset may be validated in real-time based on asset templates. The asset templates may be based on training a machine learning algorithm on various building data and the digital twins of various buildings.

The process 300 may be repeated for each asset, resulting in a digital twin of the commercial real-estate building. The Intelligent Building Edge Application Server 140 may send the generated digital twin to the Intelligent Building Cloud Application Server 170 of the Intelligent Building Cloud Platform 165 over the network 160. The Intelligent Building Cloud Application Server 170 may store the digital twin as the Digital Twin 180 in the Building Data 175. The Intelligent Building Cloud Platform 165 may perform cloud analytics and processing based on integrating the data stored in the Digital Twin 180 of the different buildings 102. The Intelligent Building Cloud Application Server 170 may access the Historical Data 185, the Digital Twin 180, and the Actor Model 182 in order to perform analytics that provide additional insights into the devices and systems of the corresponding building 102a. The Intelligent Building Edge Application Server 140 may also store the digital twins of the buildings 102 at the edge as Building Edge Data 145. An example Building Edge Data 145a includes an Edge Digital Twin 150 and an Edge Actor Model 155. The Intelligent Building Edge Application Server 140 may use the Building Edge Data 145 for performing edge analytics and processing.

Figure 4:
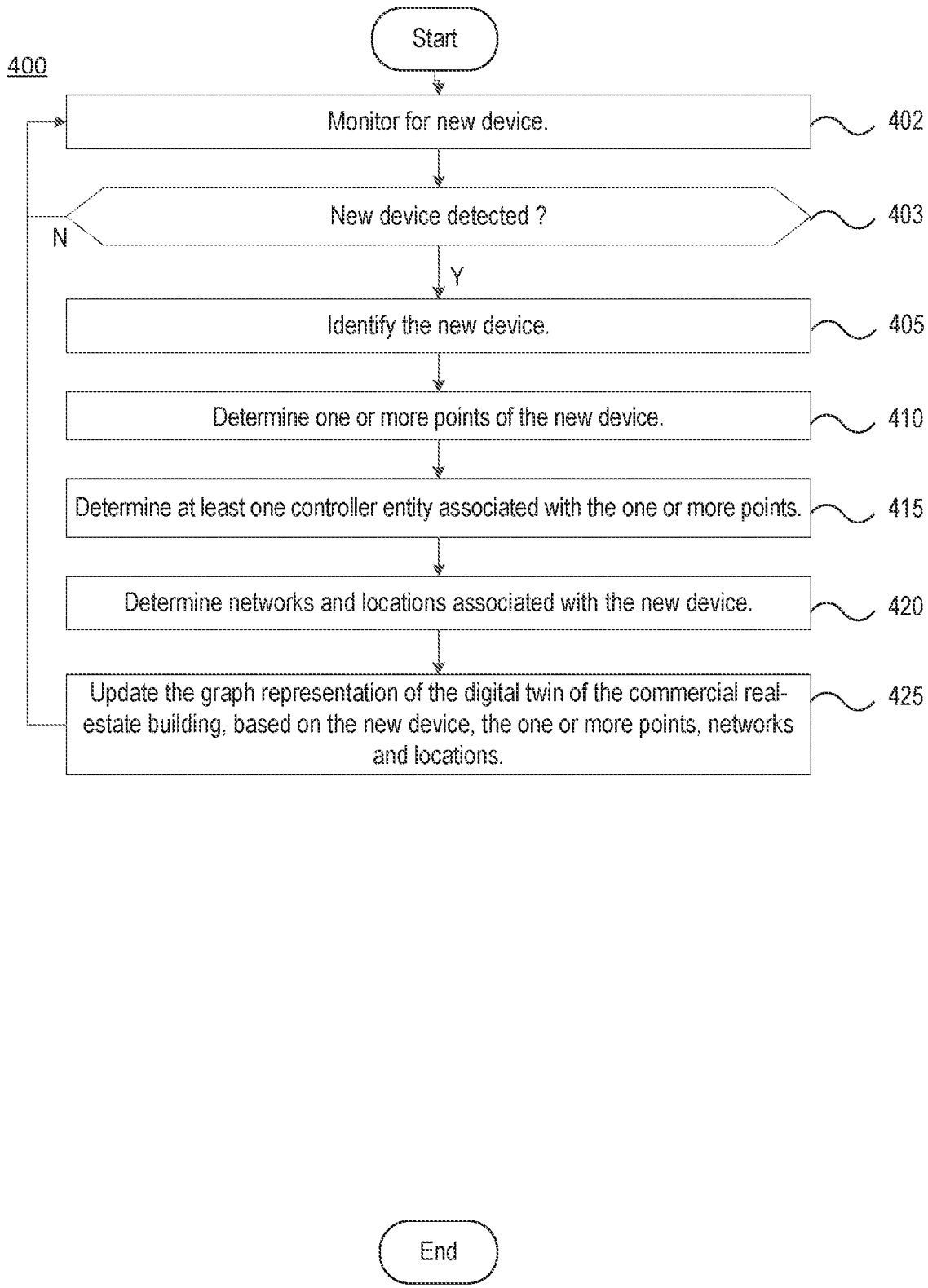
FIG. 4 illustrates another example process for providing an IoT contextually-aware digital twin with enhanced discovery performed by the example system shown in FIG. 1.

FIG. 4 illustrates another example process 400 for providing an IoT contextually-aware digital twin with enhanced discovery performed by the example system shown in FIG. 1. At stage 402, the process 402 may include monitoring for a new device connected to a network. The network may be a BAC network. A command may be issued on the network to detect new devices. The command may be a "whois" command on a BAC network. The command may retrieve the device identifiers of devices connected to the network. At stage 403, the process 400 detects a new device. The device identifiers may indicate a new device that is connect to the network. At stage 405, the new device is identified and the device characteristics may be determined. At stage 401, the process 400 includes determining one or more points of the new device. The one or more points of the new device may be determined based on information stored in the Device Library 190. The Device Library 190 in the Intelligent Building Cloud Platform 165 may include various information about the relationships between devices and controllers generated based on training a machine learning algorithm on the data of various building systems. At stage 415, the process 400 may include identifying at least one controller entity associated with the one or more points of the new device. At stage 420, the process 400 includes determining the network and location entities associated with the new device. At stage 425, the process 400 may include updating the graph representation of the digital twin of the commercial real-estate building with the points, networks, controller and locations associated with the new device. At stage 435, the process 400 may return to stage 402 monitor for a new device.

In some implementations, a User Interface (UI) may be provided for on-boarding building systems and devices. The Intelligent Building Edge Application Server 140 may be configured to provide an application and User Interface (UI) for generating a contextually-aware digital twin of a building. In order to access the application and UI, a user may connect a machine to a network of the building. The network may interface with a BACnet. The machine may be a laptop or an IoTium edge device. The user may provide information about a building, select a building from a list of buildings, and add all or some of the assets associated with the selected building to a database. The user may then run a command, such as a "whois" command, on the BACnet to discover the devices on the network. In response, the device identifiers for each of the devices associated with each of the assets may be obtained. The user may obtain additional details about the devices corresponding to the device identifiers by running a "whohas" command, on the BACnet. Based on the device identifiers, the points corresponding to the devices may be identified based on device information stored in, for example, the Device Library 190. The points may be added to the assets and saved to the database. The determined relationships associated with the asset may be validated in real-time based on asset templates. The asset templates may be based on training a machine learning algorithm on various building data and the digital twins of various buildings. The asset templates may be stored in a Document/NoSQL database that is integrated with the graph database representation of the building. In addition to the BACnet discovery discussed above, various information about the devices, such as the physical location, may also be retrieved from. dwg format files.

The graph representation of the building may track other static information about devices such as a manufacturer, serial number, model number, etc. Implementations may access the digital twin of a building to support user queries. For example, a user may, through an application on a user device, such as a smartphone, pull up data for the building or query information about the values of devices. Since the edge application is constantly updating the digital twin at the edge, it is possible to quickly and efficiently search for various information about the current state of the building systems.

Figure 5:
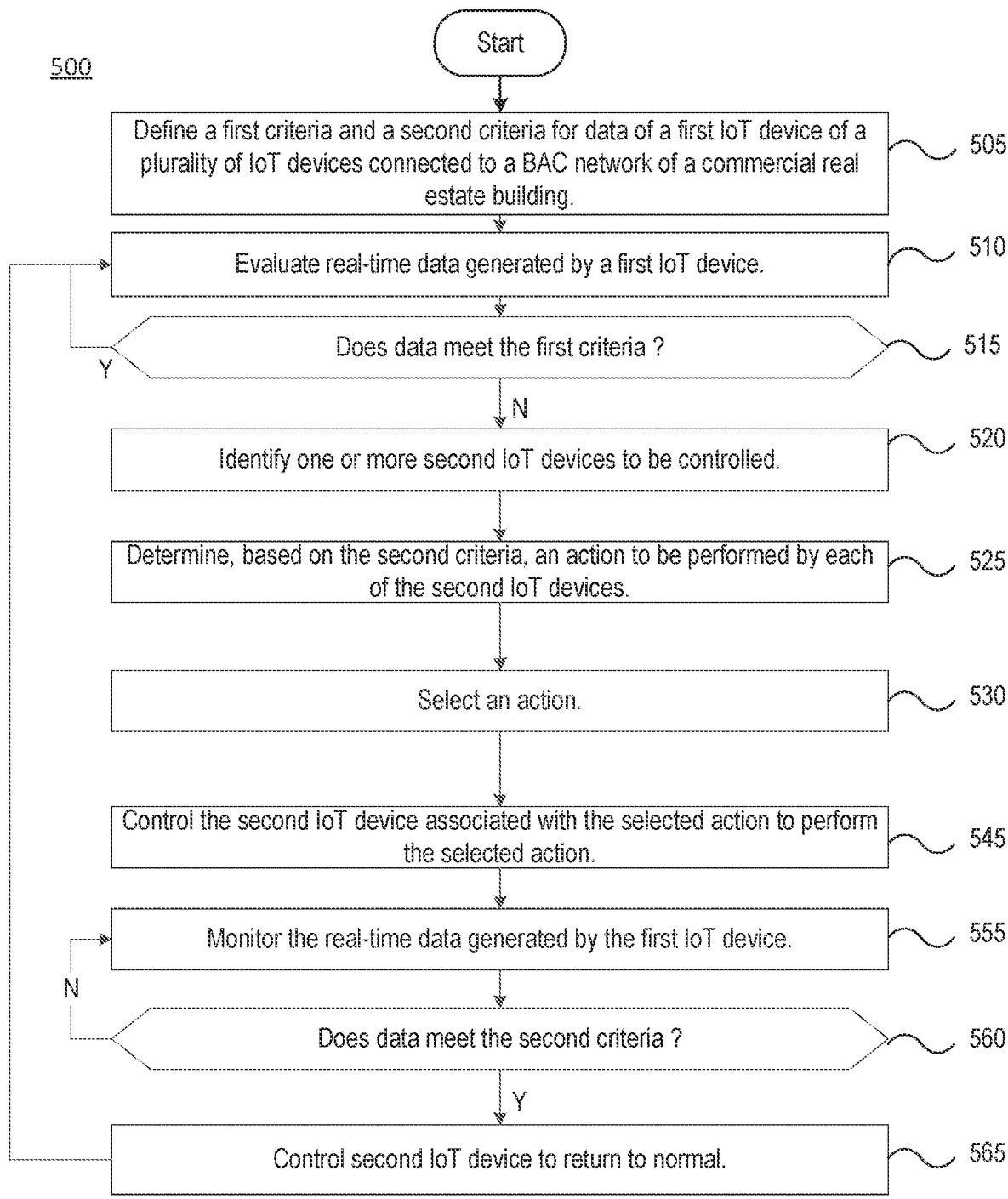
FIG. 5 illustrates another example process for providing IoT edge analytics and control performed by the example system shown in FIG. 1.

FIG. 5 illustrates an example process 500 for providing IoT edge analytics and control performed by the example system shown in FIG. 1. While FIG. 5 is described with reference to FIG. 1, it should be noted that the method steps of FIG. 5 may be performed by other systems.

Figure 8:
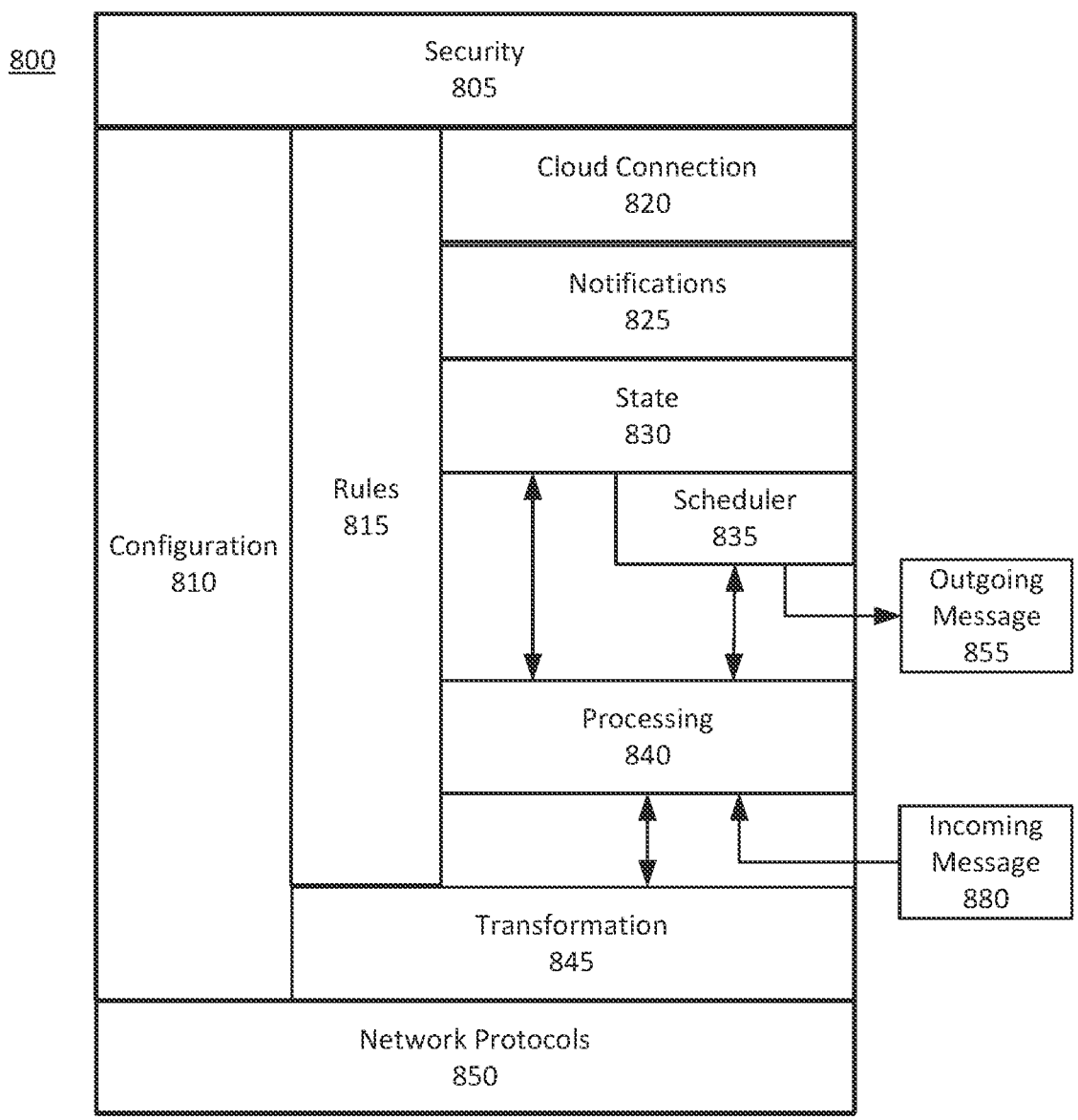
FIG. 8 illustrates an example representation of an actor system in an actor model.

Representations of building systems and devices may be created using an actor model, such as the Edge Actor Model 155. The actors may correspond to devices or groups of devices related to building systems, such as HVAC, lighting, etc. FIG. 8 illustrates an example actor system 800 in an actor model, such as the Edge Actor Model 155. For example, a sensor may communicate a real time measurement, such as temperature, to an actor corresponding to the sensor. The measurement may be communicated to the actor corresponding to the sensor device as an Incoming Message 880. The Incoming Message 880 is processed by a Processing module 840. The Processing module 840 may update the device state stored in the State 830 based on the sensor measurement received in the Incoming Message 880. The actor 800 may also receive messages from other actors for access to the latest sensor measurement stored in the State 830. The actor 800 may also send messages to the sensor device to update the device configuration. The data generated by each device is collected in different amounts and at different time intervals. The time interval is dependent on an importance of the device point for real-time control and analytics. For example, a damper percentage may be designated as having a medium priority, and thus data relevant for measuring the damper percentage may be collected from the devices at a five minute interval. A zone temperature may be designated as having a high priority, and thus data relevant for measuring the zone temperature may be collected from the relevant device points at a 30 second interval. An alarm may be designated as having a highest priority, and thus data relevant for measuring triggering of the alarm may be collected in real-time based on a change of value. Since thousands of devices may be requesting data at different intervals, the priority amongst devices needs to be maintained in order to reduce overloading of the BACnet bandwidth. The actor model may be able to handle millions of messages per second. The actor model is set up to mimic the device built in environment. In other words, the actor model maintains a stateful representation of the device. When the data indicates a defective value within a set up window, the corrective actions are triggered based on the rules in Rules 815. This enables a quicker response in real time without a need for cloud connectivity and reduces network bandwidth usage, response time, and manual input.

An actor that triggers a rule may query connected devices and assets to find an optimum solution based on the current situation of the system. Once data related to various solutions is received, the best option may be determined based on pre-determined constraints and settings, such as energy usage, time required, etc. In some implementations, device analytics may be provided to model expected performance of a device based on a current state, and the device may be controlled based on computations in real-time using context aware data. By maintaining a stateful machine representation of the device, the exact behavior of a device may be modeled by training a data analytics machine learning algorithm on the real-time data of the input and output data points of the device. Implementations may provide precision command and control for an infinite number of stateful scenarios of the device instead of just a handful that are included in the device's onboard controller. The actor model may be implemented by a distributed computing and non-blocking framework, such as Akka. The actor model and rules may be stored as the Actor Model 182 in the Building Data 175 of the Intelligent Building Cloud Application Platform 165. In addition to hosting the Actor Model 182 in the cloud, implementations may also run the actor system at the edge, which avoids reliance on cloud computing and enables better real-time response.

At stage 505, the process 500 includes setting up the rules for each of the actors. The Intelligent Building Edge Application Server 140 and the IoT Gateway 125 may be configured to provide edge based analytics and control of the devices 110 and the controllers 113 based on rules. For example, a rule may be set to trigger an action based on receiving real-time data related to a supply air temperature that has exceeded a min/max alarm threshold. The rule may indicate that if the supply air temperature falls below a minimum threshold value or exceeded a maximum threshold value for more than five minutes, then actions must be taken to adjust air temperature to a preferred temperature set as a predetermined value. The rule may be stored in the Rules 815 of the actor 800 corresponding to the temperature sensor.

At stage 510, the process 500 includes monitoring the incoming real-time data from the temperature sensor device as an Incoming Message 880, and at stage 515, the process 500 includes processing the Incoming Message 880 and evaluating whether the real-time data meets the rule stored in the Rules 815. A windowing function may ensure that a specific number of consecutive real-time measurements are received from the temperature sensor in order for the rule in the Rules 815 to be triggered. Upon a determination that the supply air temperature has fallen below the minimum threshold value or exceeded the maximum threshold value for more than five minutes, the process 500 moves to stage 520.

At stage 520, the process 520 includes requesting other actors for information for adjusting the air temperature to the predetermined value. For example, other actors relevant for maintaining the air supply temperature may include devices related to a chiller system, an FPB, or other devices configured to effectuate local changes that may impact the air supply temperature. The air temperature actor may send the request to other actors via an Outgoing Message 855. The other actors may receive the Outgoing Message 855 and determine the actions their devices may take in order to achieve a solution, based on the current state of their devices. For example, the actor corresponding to the chiller may determine that operating the chiller for 5 min at 12 Kw is needed to adjust the air temperature to the preferred temperature. The actor corresponding to the FPB (Fan Powered Box) may determine that operating its devices for 2 min at 14 Kw is needed to adjust the air temperature to the preferred temperature. The actor corresponding for local changes may determine that operating its devices for 7 min at 9 Kw is needed to adjust the air temperature to the preferred temperature. Each actor sends this information as an Outgoing Message 855 to the air temperature actor which receives the information as Incoming Messages 880 and processes the messages. At stage 503 of the process 500, the air temperature actor may select a solution based on evaluating the information received from the other actors based on other considerations related to, for example, time, energy, and feasibility. At stage 545, the process 500 includes executing the solution by notifying the relevant assets. The air temperature actor may notify the relevant actor to take an action for executing the solution proposed by the actor. For example, the air temperature actor may send an Outgoing Message 855 to notify the chiller actor to operate the chiller for 5 minutes at 12 KW. The chiller actor receives the message from the air temperature actor as an Incoming Message 880. The chiller actor turns on the cooling system in order to decrease the air temperature and notifies the air temperature actor. At stage 555 of the process 500, the air temperature actor monitors the air temperature based on continuing to receive real-time temperature measurements. At stage 560, the process 500 includes determining whether the air temperature meets the criteria set by the rule stored in the Rule 815. Upon a determination that the air temperature has returned to the preferred temperature, at stage 565 of the process 500, the air temperature actor notifies the chiller to return to its normal operation.

Performing edge based device analytics (i.e. space temperature rate of change) may be used for controlling a device, for example, an air damper, without relying upon cloud compute. Performing edge device analytics relies on accessing the digital twin at the edge to perform a computation rather than relying on the digital twin stored in the cloud. For example, a device may have a data point called space temperature, which may have a function that checks for the rate of change of that value. If the rate of change exceeds a threshold consecutively for a given time period, the air damper of the device closes. This enables the device to act quickly to an urgent fire related condition without relying upon network connectivity to the cloud platform in order to provide a command back to the device.

In some implementations, the data collected from the devices may be stored in a time series database. If a user is attempting to change the temperature, or check on a current status of a VAV box, it is inefficient and expensive to query the cloud stored data. Thus, implementations provide information about the VAV box or other devices within the most recent period, such as 24 hours. If, based on the most recent data, it is observed that the present behavior of the device is not as expected, the cloud platform may be accessed for querying the cloud stored big data related to the device. This may happen based on both the end user triggering or requesting the query or automatically based on preset parameters and thresholds. In some implementations, artificial intelligence and machine learning may be used to analyze and identify anomalies at the same time as the data is being collected. In some implementations, a time bounding may be set of the last 30 sec or other predetermined time period of the data flowing in or being collected. Based on observed patterns in the data, an alert may be triggered which in turn triggers an action to be performed by various devices or systems. Using machine learning by training a machine learning algorithm on previously collected data enables implementations to predict anomalies in the device data as it is being collected. Implementations may access collected data and evaluate it to gain insights. The data that comes off of that could provide previously unknown insights that would not be possible to obtain using traditional methods. Additionally, implementations are able to maintain and manipulate the state machine for entire subsystems.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:
1. A method of generating a contextually-aware digital twin of a first commercial real estate building comprising:
generating information about relationships for devices based on training a machine learning algorithm, wherein the relationships are between physical entities of the first commercial real estate building;
inserting the information about the relationships into a device library via a computing connectivity link;
receiving, by a computing device, device data about an asset comprising one or more devices residing in one or more physical spaces associated with the first commercial real estate building via a building communication link, wherein the building communication link is separate from the computing connectivity link;
storing, by the computing device, the device data about the one or more devices in the device library;
discovering, based on a received identification of a discovered device connected to an associated network, whether the discovered device is stored in a graph representation of the first commercial real estate building;
accessing the device data from the device library, wherein the device data includes the information about the relationships;
when the device data from the device library is known about the discovered device,
identifying device information about the discovered device from the accessed device data;
predicting at least one relationship associated with the discovered device;

in response to the predicting, automatically creating one or more related entities and one or more relationships associated with the discovered device; and in response to the creating, automatically setting up one or more nodes and relationships of an asset in the a contextually-aware digital twin based on the created one or more related entities and relationships; and when the discovered device is not stored in the graph representation, modifying the graph representation to include the discovered device with the identified device information.

2. The method of claim 1, wherein the identifying comprises predicting a relationship between the discovered device and another entity of the graph representation of the first commercial real estate building.

3. The method of claim 1, further comprising:
including manufacturer information in the stored device data at the device library.

4. The method of claim 3, further comprising:
including model information in the stored device data at the device library.

5. The method of claim 3, further comprising:
obtaining a manufacturer identification of the discovered device; and
accessing the device information based on the manufacturer identification.

6. The method of claim 4, further comprising:
obtaining a model identification of the discovered device; and
accessing the device information based on the model identification.

7. The method of claim 2, further comprising:
determining at least one controller associated with at least one or more points of the discovered device.

8. The method of claim 1, further comprising:
training the machine learning algorithm with the received device data on the contextually-aware digital twin.

9. The method of claim 1, further comprising:
determining one or more points based on the device information.

10. The method of claim 1, wherein the machine learning algorithm is performed on contextually-aware digital twins of at least one other commercial real estate building.

11. The method of claim 1, wherein the relationship is between a controller and at least one device.

12. The method of claim 1 further comprising:
executing the machine learning algorithm on the contextually-aware digital twin of the first commercial real estate building to provide a recommendation for a second commercial real estate building, wherein the first commercial real estate building and the second commercial real estate building are different.

13. The method of claim 1 further comprising:
collecting data across a plurality of commercial real estate buildings; and
training the machine learning algorithm on the collected data.

14. The method of claim 13 further comprising:
detecting at least one pattern from the collected data; and
generating a recommendation for a third commercial real estate building based on the detected at least one pattern.

15. The method of claim 13, wherein the collected data is crowd sourced.

16. A system for generating a contextually-aware digital twin of a first commercial real estate building comprising:
one or more processors; and
a memory storing computer-readable instructions that, when executed by the one or more processors, configure the one or more processors to:
generate information about relationships for devices based on training a machine learning algorithm, wherein the relationships are between physical entities of the first commercial real estate building;
insert the information about the relationships into a device library;
receive device data about an asset comprising one or more devices residing in one or more physical spaces associated with the first commercial real estate building;
store the device data about the one or more devices in the device library;
discover, based on a received identification of a discovered device connected to an associated network, whether the discovered device is stored in a graph representation of the first commercial real estate building;
access the device data from the device library, wherein the device data includes the information about the relationship;
when the device data from the device library is known about the discovered device,
identify device information about the discovered device from the accessed device data;
predict at least one relationship associated with the discovered device;
in response to the predicting, create one or more related entities and relationships associated with the discovered device; and
in response to the creating, automatically set up one or more nodes and relationships in the a contextually-aware digital twin based on the created one or more related entities and relationships; and
when the discovered device is not stored in the graph representation, modify the graph representation to include the discovered device with the identified device information.

17. The system of claim 16, wherein the memory storing computer-readable instructions that, when executed by the one or more processors, configure the one or more processors to:
predict a relationship between the discovered device and another entity of the graph representation of the first commercial real estate building; and
determine at least one controller associated with at least one or more points of the discovered device.

18. The system of claim 16, wherein the memory storing computer-readable instructions that, when executed by the one or more processors, configure the one or more processors to:
include manufacturer and model information in the stored device data at the device library;
obtain a manufacturer and model identification of the discovered device; and
access the device information based on the manufacturer and model identification.

19. The system of claim 16, wherein the memory storing computer-readable instructions that, when executed by the one or more processors, configure the one or more processors to:
train the machine learning algorithm with the received device data on the contextually-aware digital twin.

20. The system of claim 16, wherein the memory storing computer-readable instructions that, when executed by the one or more processors, configure the one or more processors to:
  determine one or more points based on the device information.

21. A non-transitory machine-readable storage medium comprising machine-readable instructions for causing a processor to execute a method of generating a contextually-aware digital twin of a first commercial real estate building comprising:
  generating information about relationships for devices based on training a machine learning algorithm, wherein the relationships are between physical entities of the first commercial real estate building;
  inserting the information about the relationships into a device library;
  receiving device data about an asset comprising one or more devices residing in one or more physical spaces associated with the first commercial real estate building;
  storing the device data about the one or more devices in the device library;
  discovering, based on a received identification of a discovered device connected to an associated network, whether the discovered device is stored in a graph representation of the first commercial real estate building;
  accessing the device data from the device library, wherein the device data includes the information about the relationships;
  when the device data from the device library is known about the discovered device, identifying device information about the discovered device from the accessed device data;
  when the device data from the device library is known about the discovered device, predicting at least one relationship associated with the discovered device;
  when the device data from the device library is known about the discovered device, in response to the predicting, creating one or more related entities and relationships associated with the discovered device;
  when the device data from the device library is known about the discovered device, in response to the creating, automatically setting up one or more nodes and relationships in the a contextually-aware digital twin based on the created one or more related entities and relationships; and
  when the discovered device is not stored in the graph representation, modifying the graph representation to include the discovered device with the identified device information.

22. The non-transitory machine-readable storage medium of claim 21, wherein the machine-readable instructions cause the processor to execute the method comprising:
  predicting a relationship between the discovered device and another entity of the graph representation of the first commercial real estate building; and
  determining at least one controller associated with at least one or more points of the discovered device.

23. The non-transitory machine-readable storage medium of claim 21, wherein the machine-readable instructions cause the processor to execute the method comprising:
  including manufacturer and model information in the stored device data at the device library;
  obtaining a manufacturer and model identification of the discovered device; and
  accessing the device information based on the manufacturer and model identification.

24. The non-transitory machine-readable storage medium of claim 21, wherein the machine-readable instructions cause the processor to execute the method comprising:
  training the machine learning algorithm with the received device data on the contextually-aware digital twin.

\* \* \* \* \*